United States Patent [19]

Peters

[11] Patent Number: 4,639,860

[45] Date of Patent: Jan. 27, 1987

[54] WRAP-AROUND LOGIC FOR INTERPROCESSOR COMMUNICATIONS

[75] Inventor: Arthur Peters, Sudbury, Mass.

[73] Assignee: Honeywell Information Systems Inc., Waltham, Mass.

[21] Appl. No.: 806,123

[22] Filed: Dec. 6, 1985

Related U.S. Application Data

[63] Continuation of Ser. No. 377,300, May 12, 1982, abandoned.

[51] Int. Cl.[4] ............................................. G06F 15/16
[52] U.S. Cl. .................................................... 364/200
[58] Field of Search ................................. 364/200, 900

[56] References Cited

U.S. PATENT DOCUMENTS

| | | | |
|---|---|---|---|
| 4,038,644 | 7/1977 | Duke et al. | 364/900 |
| 4,041,472 | 8/1977 | Shah et al. | 364/900 |
| 4,204,252 | 5/1980 | Hitz et al. | 364/200 |
| 4,214,303 | 7/1980 | Joyce et al. | 364/200 |
| 4,223,380 | 9/1980 | Antonaccio et al. | 364/200 |
| 4,257,095 | 3/1981 | Nadir | 364/200 |
| 4,281,380 | 7/1981 | DeMesa, III et al. | 364/200 |
| 4,379,340 | 4/1983 | Holtey et al. | 364/900 |
| 4,494,190 | 1/1985 | Peters | 364/200 |

Primary Examiner—Gareth D. Shaw
Assistant Examiner—Daniel K. Dorsey
Attorney, Agent, or Firm—Nicholas Prasinos; John S. Solakian

[57] ABSTRACT

A minicomputer system is disclosed having a bus with a plurality of processors and/or subprocessors, input/output (I/O) units and including logic for enabling an alternate route for issuing instructions from one processor to another. The logic detects information that is not to be transferred to the I/O devices and accordingly reroutes it back to the central processor and/or subprocessors.

4 Claims, 3 Drawing Figures

WRAP-AROUND LOGIC FOR INTERPROCESSOR COMMUNICATIONS

This application is a continuation of application Ser. No. 377,300, filed May 12, 1982, now abandoned.

RELATED APPLICATION

The following U.S. patent application filed on an even date with the instant application and assigned to the same assignee as the instant application is related to the instant application and is incorporated herein by reference.

"FIFO Listener Apparatus" by Arthur Peters, which has been amended to "FIFO Buffer to Cache Memory", having U.S. Ser. No. 377,299 and filed on May 12, 1982 now abandoned.

DESCRIPTION

1. Field of the Invention

The invention pertains to minicomputer systems and more particularly to a minicomputer system having a bus with a plurality of processors and including logic for enabling an alternate route for issuing instructions from one processor to another.

2. Description of the Prior Art

In a system having a plurality of devices coupled over a common bus, an orderly system must be provided by which bidirectional transfer of information is provided between such devices. This problem becomes more complicated when such devices include, for example, one or more data processors, one or more memory units, and various types of peripheral devices.

Various methods and apparatus are known in the prior art for interconnecting such a system. Such prior art systems range from those having common data bus paths to those which have special paths between various devices. Some systems also may include capability for either synchronous or asynchronous operation in combination with the bus type. Some such systems require the data processing control of any data transfers on the bus even though the transfer may be between devices other than the data processor.

One prior art system utilizing a common electrical bus for coupling a plurality of units in a data processing system for transfer of information therebetween is shown in U.S. Pat. No. 4,030,075. Another is shown in U.S. Pat. No. 3,993,981. The manner and paths for transferring data in such systems, as well as the manner in which any one device may control data transfers, are dependent upon the implementation of the system; i.e., whether there is a common bus, whether the operation is synchronous or asynchronous, etc. The system's response and throughput are greatly dependent on the various structures.

OBJECTS OF THE INVENTION

It is accordingly a primary object of the invention to provide an improved data processing system.

It is another object of the invention to provide an improved data processing system having a plurality of devices, including at least one data processor connected to a common bus.

It is a further object of the invention to provide an improved data processing system having a plurality of processors, and at least one input/output (I/O) device connected to a common bus and including logic means for capturing information from the system bus and returning it to one central processor without the utilization of the I/O device.

It is still another object of the invention to provide an improved data processing system having a plurality of devices, including a plurality of processors and including logic means for enabling an alternate route for issuing instructions from one processor to another.

SUMMARY OF THE INVENTION

These and other objects of the invention are obtained by providing a data processing system comprising a plurality of units including a central processor, a subordinate processor and one I/O unit, a common electrical bus coupled to each of the units for providing a path for the transfer of information between any two units and further including logic for capturing information from the common bus and returning it to a central processor without the utilization of an I/O device. This logic enables an alternate route for issuing instructions from the central processor to the subordinate processor.

The processor and its subprocessors are connected by dedicated private interfaces. Instructions are issued from the central processor to these interfaces. The bus wrap-around logic provides the capability to instruct the subprocessor from the central processor utilizing input/output commands of the I/O unit.

The bus wrap-around logic detects information that is not to be transferred to the I/O devices and accordingly reroutes it back to the central processor and/or its subprocessors. The invention utilizes two pairs of interfaces—the main pair and the wrap-around pair. When performing diagnostics on the system, the central processing unit communicates with these pairs and the other processors and can utilize alternate paths for communicating with the processors. The system that may be malfunctioning can thus be isolated by compairing responses received from alternate paths.

The bus wrap-around logic comprises means for capturing information signals associated with a bus cycle operation, means for storing the information, means for detecting to which unit the information must be forwarded, and means for forwarding the information back to the central processor.

DESCRIPTION OF THE PREFERRED EMBODIMENTS

Figure 1:
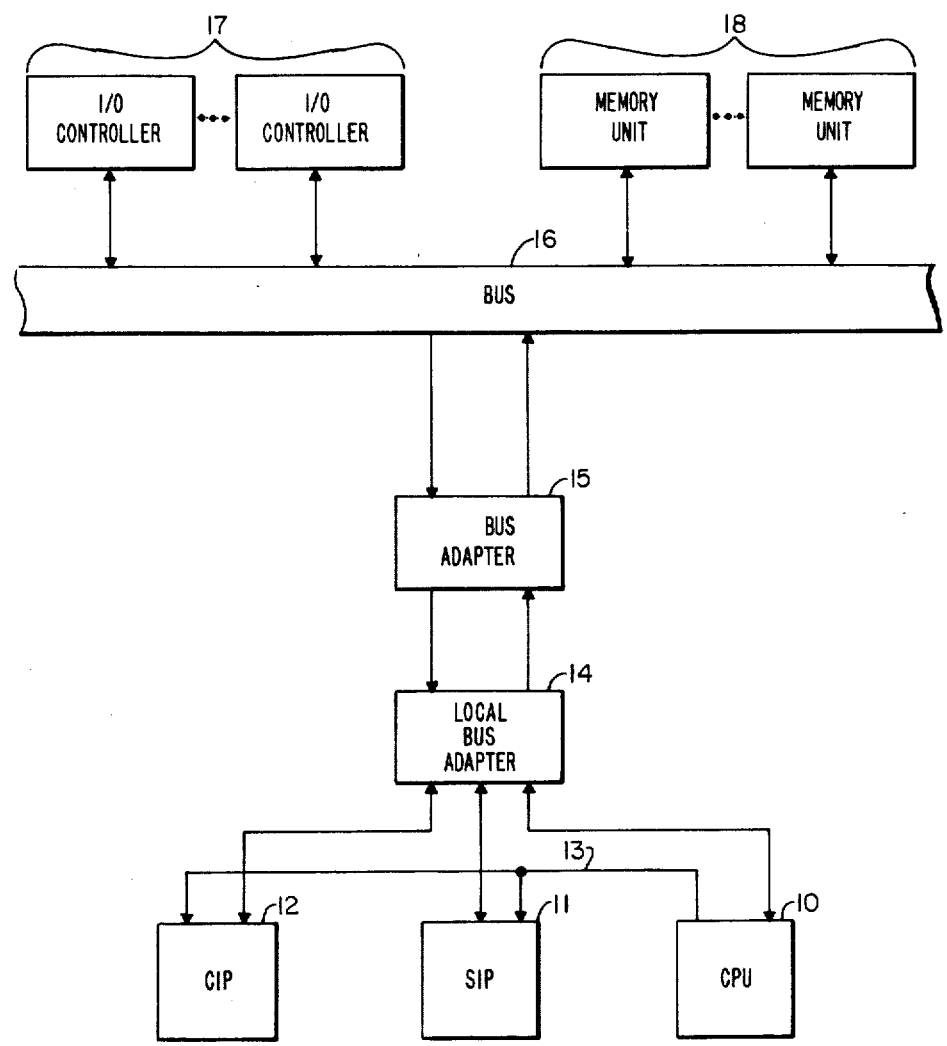
FIG. 1 is a general block diagram of a typical data processing system in which the invention operates.

Referring to FIG. 1, the data processing system includes a central processing unit (CPU) 10, optional unit (CPU) 10, optional processors including a scientific instruction processor (SIP) 11 and a commercial instruction processor (CIP) 12. These optional processors may be used to extend the range of the CPU 10 for special applications. The CPU 10, SIP 11 and CIP 12 communicate by way of a local bus 13. Each of the processors further communicates by way of bidirectional communication links with a local bus adapter 14 which includes a memory management unit and a cache memory system. The cache memory system provides a buffer storage for that portion of main memory that is currently being used by the CPU 10, SIP 11, and CIP 12. The memory management unit provides for the translation of main memory addresses to cache memory addresses.

The local bus adapter is in electrical communication with a bus adapter 15 which provides an interface with an asynchronous communication bus referred to as the bus 16. The bus 16 is a common communication bus for accommodating a plurality of system devices including I/O controllers for controlling the operation of peripheral devices such as magnetic tape and disk devices, and a main memory comprised of memory units 18. The computer system of FIG. 1 is disclosed in detail in U.S. Pat. Nos. 3,993,981 and 4,030,075. The invention resides in the bus adapter 15 and is described in detail below.

In referring to the drawings, it is to be understood that the same reference numbers refer to the same devices in the Figures.

Figure 2:
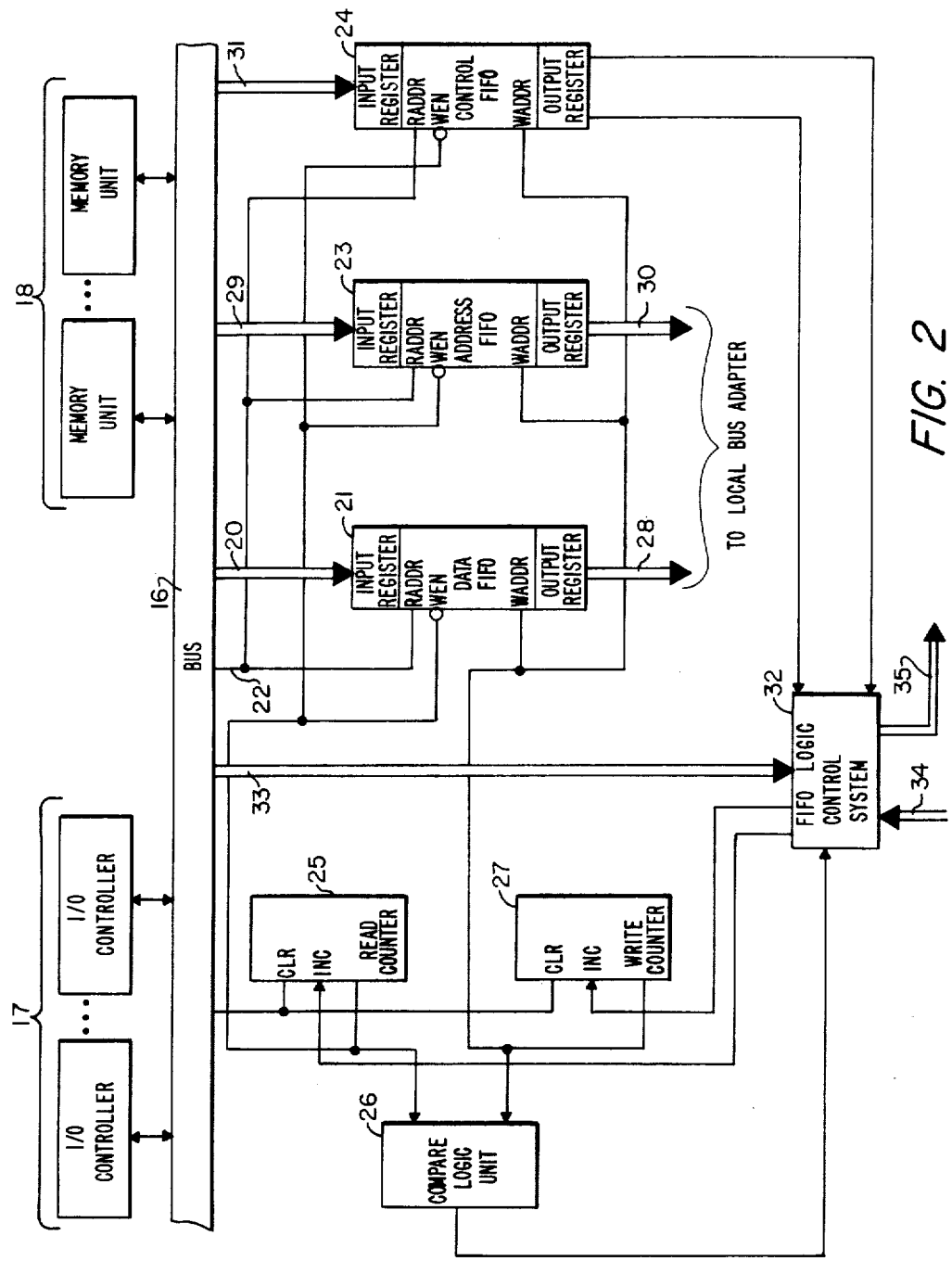
FIG. 2 is a functional block diagram of the invention.

Referring now to FIG. 2, the bus 16 provides thirty-two bits of data by way of a data bus 20 to a parallel input of a thirty-two bit first-in-first out (FIFO) register 21. The FIFO register 21 receives a write enable input from the bus 16 by way of a control line 22 which also is connected to the write enable inputs of thirty-two bit FIFO registers 23 and 24.

The read address (RADDR) input to the FIFO register 21 is connected to the output of a two bit read counter 25, to one input of a compare logic unit 26, and to the RADDR inputs of the FIFO registers 23 and 24. The write address (WADDR) input to the FIFO register 21 is connected to the output of a two bit write counter 27, to a second input of the compare logic unit 26, and to the WADDR inputs to the FIFO registers 23 and 24. The parallel output of the FIFO register 21 is connected to a thirty-two bit data bus 28 leading to the local bus adapter 14 of FIG. 1.

The parallel input to the FIFO register 23 is connected to the bus 16 by way of a twenty-four bit address bus 29, and the parallel output of the FIFO register 23 is applied to the local bus adapter 14 by way of a twenty-four bit address bus 30.

The FIFO register 24 receives eleven bits of control information from the bus 16 by way of an eleven bit control bus 31. The bit write position of the output register of the FIFO register 24 is applied to one input of a FIFO logic control system 32, and a bit MREF position of the output register is applied to a second input of the logic control system 32. The logic control system 32 also receives control information from the bus 16 by way of a seven bit control bus 33, and control information from the local bus adapter 14 by way of a twelve bit control bus 34. The logic control system 32 further receives the output of the compare logic unit 26, and supplies increment commands to the read counter 25 and the write counter 27. The logic control system 32 further provides control information to the local bus adapter 14 by way of a ten bit control bus 35.

In operation, the bus 16 issues a timing signal by way of control line 22 upon the occurrence of a bus operation. The write enable inputs of the FIFO registers 21 and 24 thereby are activated. The FIFO logic control system 32 senses other signals from the bus 16 to detect the occurrence of timing control signals indicating that one of I/O controllers 17 has requested a bus cycle of the bus 16 to write information into memory units 18, and that an addressed one of memory units 18 has acknowledged the request. In this event, the FIFO logic control system 32 increments the write counter 27 to cause a non-equivalence indication at the output of the comparator 26. Such an indication occurs when the FIFOs contain information that must be transferred to the local bus adapter 14 of FIG. 1 for writing into the cache memory system embodied in the local bus adapter. The information occurring in the location of the FIFO registers 21 and 23, as indicated by the output of the read counter 25 thereupon, is transferred from the FIFO registers 21 and 23 to the local bus adapter 14, (FIG. 1) by way of the buses 28 and 30, respectively. That information occurring in the location of FIFO 24 as indicated by the output of read counter 25 is sensed by the FIFO logic control system 32. In response to such control signals, the control system 32 issues control signals by way of the control bus 35 to control the transfer of the information from the FIFOs 21 and 23 located in the bus adapter 15 of FIG. 1 to the local bus adapter 14. Upon an indication by the local bus adapter 14 that the information transferred from FIFO 21 has been written into the cache memory system at the location indicated by the addressed location at FIFO 23, the control system 32 increments the read counter 25 to cause the output of the compare logic unit 26 to indicate the occurrence of an equivalence between the counters 25 and 27.

In this manner, as the information to be written by the I/O controllers 17 into the memory units 18 appears on the bus 16, such information is captured by the FIFOs 21-24 and transferred to the local bus adapter. After the information written into the memory units 18 has also been written into the cache memory system, the FIFO logic control system 32 increments the read counter 25 to cause the counters 25-27 to be equal. If the output of the comparator 26 indicates equivalence, the FIFO logic control system 32 interprets this to mean that there is no information in the FIFOs 21 and 23 which must be transferred to the local bus adapter.

The FIFOs 21-24 operate in such a manner that data, address and control words are captured as they appear on the bus 16 and stored into the location of the FIFO registers indicated by the output of the write counter 27. If that information is to be written into the cache memory system, the FIFO logic control system 32 increments (after the write into the cache is completed) the read counter 25 to point to the address of the information in the FIFOs 21-24 that was transferred to the local bus adapter. As the information is transferred to the local bus adapter, the FIFOs may capture additional information for writing into a next location of the FIFOs 21-24.

Figure 3:
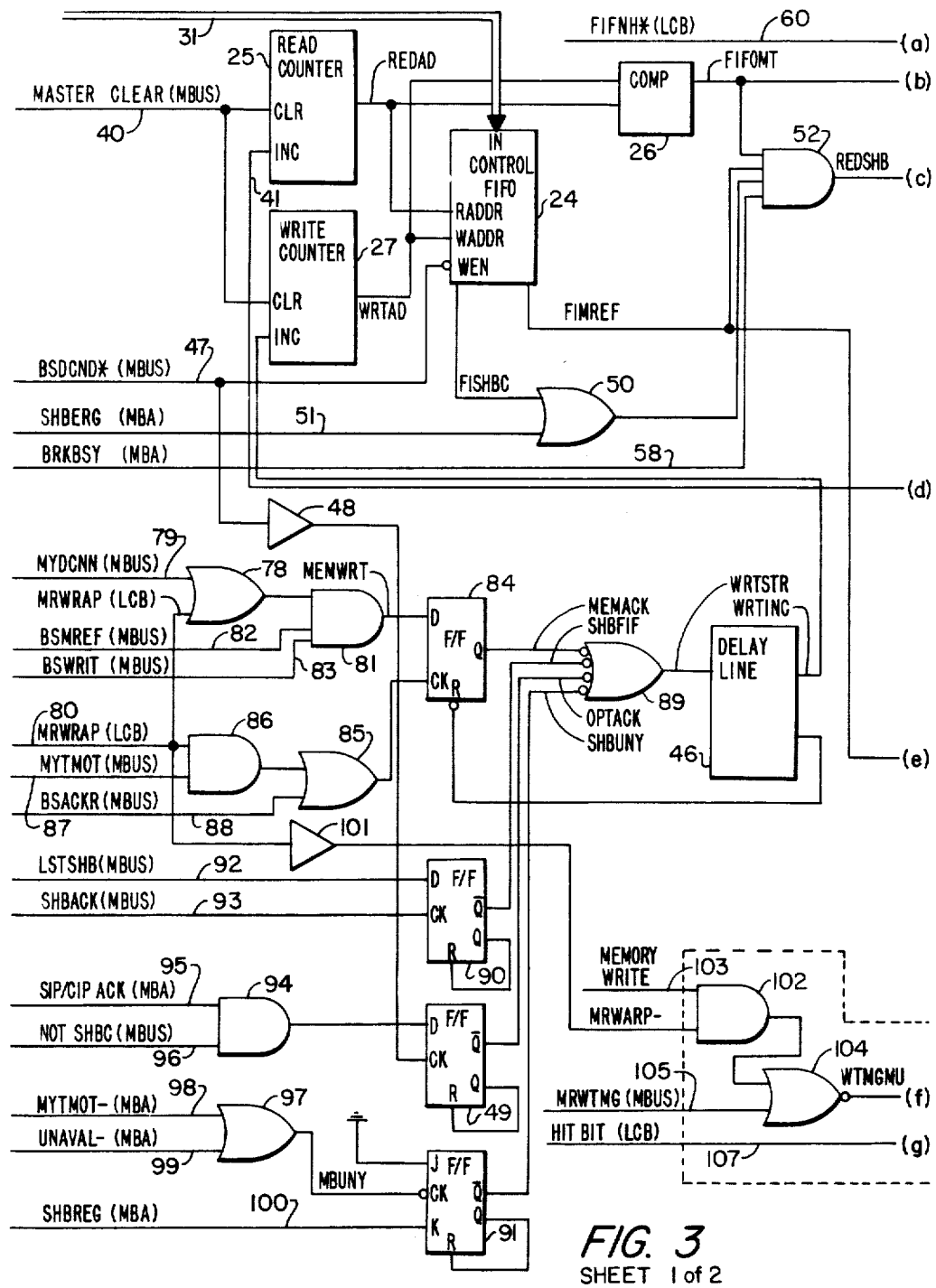
FIG. 3 is a detailed logic block diagram of the invention.
Figure 3:
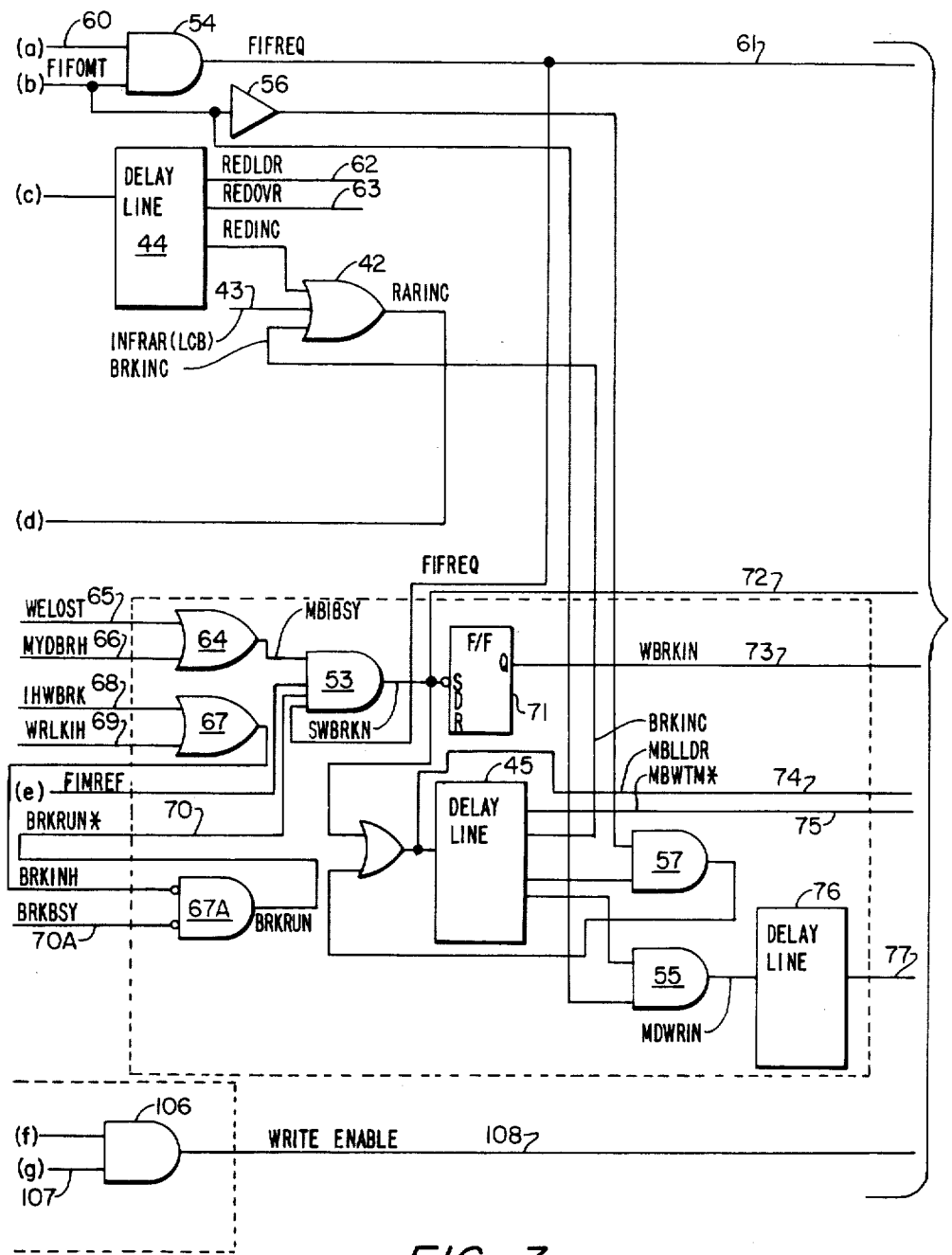

Referring now to FIG. 3, read counter 25 and write counter 27 receive a master clear signal from the bus 16 of the FIG. 2 by way of a control line 40. The increment input of read counter 25 is connected by way of a control line 41 to the output of an OR gate 42 having one input connected to a control line 43 leading from the local bus adapter 14 of FIG. 1. The second input to the gate 42 is connected to the 150 nanosecond output of a graduated delay line 44, and a third input to the gate 42 is connected to a 12.5 nanosecond output of a graduated delay line 45.

The output of the counter 25 is connected to one input of the comparator 26, and the read address (RADDR) input to the control FIFO 24. Data FIFO 21, address FIFO 23 and the write address (WADDR) input to the FIFO 24 is connected to the output of the write counter 27, the increment input of which is connected to the 30 nanosecond output of a graduated delay line 46. The write enable (WEN) input to the FIFO 24 is connected to a control line 47 (BSDCND)

leading from the bus 16 of FIG. 2. The bit SHBC output of the FIFO 24 is connected to one input of an OR gate 50, a second input of which is connected to a control line 51. The bit WREF output of the FIFO 24 is connected to one input of an AND gate 52 and to one input of an AND gate 53. The parallel input to the FIFO 24 is connected by way of the control bus 31 to the control lines of the bus 16.

A second input to gate 52 (FIFOMT) is connected to the output of the comparator 26, to one input of an AND gate 54, to one input of an AND gate 55, and by way of an inverter 56 to one input of an AND gate 57. A third input to gate 52 is connected with the output of gate 50, and a fourth input to gate 52 is connected to a control line 58 (BRKBSY). The output of gate 52 is applied to the input of the delay line 44.

A second input to AND gate 54 is connected to a control line 60 leading from the local bus adapter 14, and the output of gate 54 is applied to a second input of AND gate 53 and to a control line 61 connected to an input of the local bus adapter 14.

A 45 nanosecond output to delay line 44 is applied to a control line 62 to provide a FIFO data clock to the local bus adapter 14, and the 105 nanosecond output of the delay line 44 is applied to a control line 63 to indicate to the local bus adapter 14 that a bus cycle, during which the FIFOs 21 and 23 are to be read by the local bus adapter, has been completed.

Continuing further on FIG. 3, a second input to AND gate 53 is supplied by an OR gate 64 having one input connected to a control line 65. A second input to gate 64 is connected to a control line 66. A third input to gate 53 is connected to the output of an AND gate 67A having one input connected to the output of OR gate 67 and the other input connected to control line 70. A fourth input to gate 53 is connected to the output of AND gate 67A. The output of gate 53 is supplied to the set input of a D-type flip-flop 71, to one input of the graduated delay line 45, and to a control line 72 leading to the local bus adapter 14. The Q output of flip-flop 71 is applied to a control line 73 leading to the local bus adapter, the input to delay 45 is applied to a control line 74 leading to the local bus adapter. A 50 nanosecond output of the delay line 45 is connected to a control line 75 leading to the local bus adapter, and a 112 nanosecond output of the delay line 45 is applied to a second input of gate 57. The output of gate 57 is applied to a second input of the delay line 45. A 88 nanosecond output of the delay line 45 is applied to a second input of the gate 55, the output of which is applied to the input of a graduated delay line 76. The output of delay line 76 is applied to a control line 77 leading to the local bus adapter 14 of FIG. 1.

Referring now to the lower left hand corner of FIG. 3, an OR gate 78 receives a first input by way of a control line 79 leading from the bus 16, and a second input by way of control line 80 leading from the local bus adapter 14. The output of the gate 78 is applied to one input of an AND gate 81, a second input of which is connected to a control line 82 leading from the bus 16. A third input to gate 81 is connected to a control line 83 leading from the bus 16, and the output of gate 81 is applied to the D input of a D-type flip-flop 84. The clock input to the flip-flop 84 is connected to the output of an OR gate 85 having one input connected to the output of an AND gate 86. A first input to a gate 86 is connected to the control line 80, and a second input to the gate 86 is connected to a control line 87. A second input to the gate 85 is connected to a control line 88 leading from the bus 16.

The reset input to the flip-flop 84 is connected to the 60 nanosecond output of the delay line 46 and the Q output of the flip-flop is applied to one input of a NOR gate 89. The second input to gate 89 is connected to Q compliment output of a D-type flip-flop 90, and a third input to gate 89 is connected to the Q compliment output of the flip-flop 49. A fourth input to the gate 89 is connected to the Q compliment output of a D-type flip-flop 91, and the output of the gate 89 is applied to the input of the delay line 46.

The D input of the flip-flop 90 is connected to a control line 92, and the clock input to the flip-flop is connected to a control line 93 leading from the bus 16. The reset input to the flip-flop 90 is connected to its Q output as are the reset inputs of the flip-flops 49 and 91. The D input to flip-flop 49 is connected to the output of an AND gate 94, one input of which is connected to a control line 95. A second input to the gate 94 is connected to a control line 96 leading from the bus 16. The J input of the flip-flop 91 is connected to ground and the clock input to the flip-flop is connected to the output of an OR gate 97. The inputs to gate 97 are connected to control lines 98 and 99, respectively, leading from the bus 16. The K input to the flip-flop 91 is connected to a control line 100 leading from the bus 16.

The control line 80 further is applied through an inverter 101 to one input of an AND gate 102; a second input is connected to a control line 103 leading from the local bus adapter 14. The output of gate 102 is applied to one input of a NOR gate 104; a second input is connected to a control line 105 leading from the bus 16. The output of gate 104 is applied to one input of an AND gate 106; the second input is connected to a control line 107 leading from the local bus adapter 14. The output of the gate 106 is applied to a control line 108 which is connected to an input of the local bus adapter 14.

Referring one again to FIG. 3, the logic associated with the elements 84 (MEMWRT), 90 (SHBFIF), 49 (OPTACK) and 91 detect valid inputs to the FIFO. There are four of these inputs. One input is a result of memory write operations being acknowledged; another input is a result of SHBACK to FIFO operations; a third input is the result of a first half bus cycle being acknowleged by one of the optional processors, the CIP or the SIP; and the fourth input into the FIFO would result from an error operation, or a time out operation. When a valid entry has been detected on the bus to be entered into the FIFO, it is written into the FIFO by the element 46, WRTINC. A write increment pulse is generated which increments the write counter for the FIFO. The write counter, element 27 (WRTAD), is constantly being compared with the output of the read counter, element 25 (REDAD), by the comparator, element 26 (FIFOMT). The process of incrementing the write counter makes it unequal to the contents of the read counter and causes a FIFO empty signal and a FIFO request signal to be generated in the elements 26 (FIFOMT) and 54 (FIFREQ) indicating that there is a valid entry in the FIFO that is to be disposed of. The various entries into the FIFO may be either writes or reads. If it is a read, the infomation is being returned to the MBA from either a memory or an I/O unit that has been requested. The disposition of a FIFO entry generated by a read will be handled by the read second half bus cycle timing logic which beings with the element 52 (REDSHB) and consists of the delay line element 44

(REDINC) and the elements 42 (RARINC). If it is determined that the information contained in the FIFO is a response to a read operation sent out by the MBA, the delay line 44 (REDINC) is activated by the element REDSHB. This element is activated when the FIFO is not empty. There is a valid entry if FIFO is not empty, and a read response is expected in the FIFO and in fact a read response is contained in the FIFO. Three points off the delay line 44 (REDINC) dispose of the data contained in the FIFO. The first point of the delay line, REDLDR 62, writes the FIFO data output into a register on the LCB. The second point on the delay line sends a signal to the LCB at 63 (REDOVER) which tells it that the information requested has been received, and is now available to be transmitted to the processor requesting it. The third point on the delay line REDINC causes the signal RARINC which increments the FIFO read address register to equivalence with the FIFO write address register and ends the FIFO not empty condition.

The first entry into the FIFO we will consider is the entry from memory reference writes. This is detected by elements 81, 85 and 84 and associated logic. A memory write is detected by the control signals 83 (BSWRIT), BSMREF 82 and MYDCNN not or the MRWRAP functions 79 and 78 respectively. BSMREF 82 and BSWRIT 83 and the OR MYDCNN not or MRWRAP, which is a special diagnostic control signal, are entered together by element 81 to produce a memory write signal. This memory write signal serves as a data input to flop 84. This flop is clocked by gate 85 which is timed by the signal BSACKR 88 or it is timed by the time out MYTMOT 87 if we are in a diagnostic mode MRWRAP. This (MRWRAP) indicates that there may not be a bus signal BSACKR coming from the memory which is receiving the write order because we might be addressing non-existing memory. Instead of a bus cycle coming from the memory, if the memory doesn't exist, we will receive the MYTMOT signal 87 after a certain amount of time. If we are in MRWRAP mode, this signal will give us a clock out of the gate 85 to clock the flop 84 producing the signal MEMACK. MEMACK is one of the signals which is already in gate 85 to produce the signal WRTSTR. The WRTSTR is put into a delay line and emerges from the delay line after a 60 nanosecond delay to produce the signal WRTINC through the delay line 46. The WRTINC signal is input to the increment input of the write counter—the FIFOs write counter element 27 (WRTAD). It will cause the state of the FIFO write counter to change. It will be incremented by one and it will change relative to the contents of the read address counter element 25 (READ). The comparator, element 26 (FIFOMT), which monitors the outputs of the read counter and the write counter, will detect that these two counters are unequal and create the signal FIFO not empty. If the output of the FIFO is not inhibited by a diagnostic lead, FIFO INHIBIT not, from the LCB at item 60 (FIFNHX), the gate signal FIFREQ is detected in the element 54 (FIFREQ). This is a signal indicating that there is a valid entry in the FIFO which must be disposed of.

Before discussing how the elements in the FIFO are disposed of, the logic which detects the other FIFO inputs will be discussed. The second input into the FIFO is recorded in the flop 90. This is called the SHBACK flop, which indicates that a BSSHBC signal exists on the megabus, the second half bus cycle has been accepted by the MBA board which was waiting for BSSHBC as indicated by signal 92, LSTSHB. The MBA is expecting a BSSHBC which is a response to some information it asked from memory or an I/O device. When the information returns, the SHBACK signal is generated by the MBA which clocks the flop 90. If the D input is active 92 (LSTSHB), that is we were expecting a second half bus cycle, the flop is set and will generate an input SHBACK to FIFO signal, which will energize the WRTSTR signal, as described previously for the MEMACK operation. This will be a second step operation, and this will be a second valid input written into FIFO. The response to SHBACK to FIFO input is exactly as described for the MEMACK up to the point where the FIFO request signal is generated. After that point the response is different for the different entries. A third entry into the FIFO is generated by the flop at 49, OPTACK. This flop is clocked by the delay of the DCNN signal on the bus which accompanies all operations on the bus. Ninety nanoseconds after the leading edge of a DCNN signal, a clock signal is generated at the flop 49. If the D input of the flop is true; that is, if the output of the element 94 is true, the flop is set indicating that one of the optional processors, the SIP or the CIP, has been requested and accepted the order sent to it. This is determined by the signal 95 (SIP/CIP/ACK) and 96 (NOTSHBC) which indicates that the current operation on the bus is not a second half bus cycle, but is a first half bus cycle or a command acknowledged by the SIP or CIP. The signal on line 96 in conjunction with the signal on line 95 will generate data input to the element 94 and record the OPTACK, which is a third valid input to be received by FIFO. The last input to the FIFO which is recorded in the flop 91 is called SHBUNV (second half bus cycle unavailable). This signal is a result of errors occurring on the bus. This flop is clocked by a circuit in the MBA that detects the lack of a response from some unit, either memory or an I/O device, addressed by the MBA. These are indicated by the signals 98 (MYTMOT) and 99 (UNAVAL). If a command is sent and there is no response to it, after a certain time the signal MYTMOT is generated by the MBA. If a second half bus cycle is expected from some device and it is not received by the MBA in a certain amount of time, the unavailable signal (UNAVAL) is generated. If there is no response during that time, then the unavailable signal is generated. The unavailable signal will cause the SHBC unavailable flop to be set. If the MBA is expecting information, it is indicated by the signal 100 SHBREG which indicates that we are waiting for a second half bus cycle.

Once a valid input to the FIFO has been detected as defined by the signal FIFREQ 54, further action depends on the nature of the information that has been written into the FIFO. If the information written into the FIFO was MEMACK derived from the element 84, there are two responses possible, depending upon whether the LCB is busy serving a processor when the FIFO request arrives. One of the responses possible is that the FIFO request signal sent to the LCB will generate what is called a FIFO cycle. That is, the FIFO request sent to the LCB is recognized and treated similarly to the requests from the processors. The FIFO request signal will be treated in this manner if the LCB is not busy with some operation started by one of the processors on the local bus. However, if the FIFO is busy performing some operation for a processor on the local bus at the time when it becomes aware of the FIFO request signal, the response which is generated is called a write break-in cycle. The write break-in cycle indicates that the LCB is busy and therefore must be interrupted in order to handle the memory reference write (ACKED) contained in the FIFO. The logic for doing this is located on the MBA board and consists of primarily element 53 (SWBRKN) which generates the start write break-in signal. This element detects conditions under which a write break-in operation is started in the elements 71, 45, 57, 55 and 76. Essentially the WBRKIN logic consists of an element which indicates when a WBRKIN operation must begin. A WBRKIN operation must be started if the element 64 is true. Element 64 generates the signal MBA busy MBIBSY, which indicates that a WBRKIN operation must be performed because either one of two conditions happened. The first condition is that the MBA is in a state in which it is waiting for a response to some operation it previously sent out as defined by the signal 66 MYDBRH. This means that MBA is waiting for the result of a read operation. The second condition defined by the signal 65 WELOST indicates that the MBA would like to start a bus operation for the LCB but some other process on the bus has higher priority and the operation is waiting to be started.

Element 67 detects when a WBRKIN may be started as defined by the signals IHWBRK 68 which is a signal coming from the LCB and the WRLKIH signal element 69 which also comes from the LCB. These signals indicate when the logic internal to the LCB board will permit a WBRKIN operation to be performed.

The other condition for beginning a WBRKIN is that there is a valid entry in the FIFO as defined by the signal FIFO request and the MBA and LCB are not in the process of doing some other WBRKIN cycle as defined by the signal 70 BRKRUN. In element 53 (SWBRKN), if all of its inputs are true, the signal SWBRKN is generated and will set the WBRKIN flop 71. This flop remains set for the duration of the WBRKIN process. The SWBRKN signal is also sent to the LCB, as is the WBRKIN signal; this is indicated at the beginning of a WBRKIN cycle. The SWBRKIN signal is input into a delay line which is used to time the events that must occur during a WBRKIN cycle. Three signals are derived in order to perform a WBRKIN operation. One signal MBLLDR on element 74 loads the data from the FIFO into a register inside the LCB—the local data register. The second signal MBWTMG on element 75 is sent to the LCB. This is the signal which actually performs the transfer of the data from the local data register into the cache RAMs. This is a write enable signal. The third signal is a BRKINC which is generated to increment the FIFO read address counter. The BRKINC signal is sent to element 42 where it creates the signal RARINC, which increments the FIFO read address counter. When the read address counter is incremented, it will then be made to match the write address counter which was previously incremented upon writing into the FIFO. Now that something has been unloaded out of the FIFO, as indicated by the break increment signal, the read address counter is incremented. The two counters will then become equal and the FIFO empty signal will be created which will remove the FIFO request. If upon completing one write break-in cycle an additional MEMACK entry is found in the FIFO, the FIFO empty signal will not be true and it is fed back through logic gate 57 to reinitiate the write break-in process. If there are no other entries in the FIFO which must initiate a write break-in cycle, this is detected by the gate 55 which generates the signal NDWRIN. This signal (NDWRIN) is set into delay line 76 which is sent to the LCB for reestablishing those signals in the LCB that were over-written during the write break-in process.

Information written into the FIFO entered via the signal SHBFIF from element 90 or SHBUNY from element 91 do not cause write break-in or FIFO cycles in the LCB/MBA. The response to these entries in the FIFO begins with the element 52 generating output signal REDSHB. REDSHB generates the timing signals in the delay line 44 which are necessary for transferring the information from the FIFO to the LCB. The first of three signals generated is REDLDR 62, which occurs at the 45 nanosecond point of the delay line. This signal generates a signal to the LCB which transfers the data from the FIFO into the LCBs local data register. The next point on the delay line at the 105 point is the signal REDOVR on element 63. This is also sent to the LCB and indicates to the LCB that the cycle that started at the bus is now over; the data read is over and the requested information may be transferred to the requesting processor. The third signal occurring at the 150 nanosecond point on element 43 is called REDINC. This is a read increment signal and is one of the inputs to the signal RARINC 42 which will cause the read address counter to be incremented to come into alignment with the write address counter and to remove the FIFO request signal FIFREQ from element 54 indicating that there is no longer valid information in the FIFO. This logic is invoked when some information that was requested by the LCB is received or the information that was requested by the LCB was not received after a certain time elapsed and a time out signal was generated by the MBA.

If the information contained in the FIFO was generated by the element 49 on signal OPTACK, it indicates that this is a command which has been sent from some processor on the bus and it is going to either the CIP or the SIP on the local bus. In this instance no timing on the MBA is invoked. The only signal that is sent to the LCB is the FIFO request signal. The logic and the timing for making this transfer from the FIFO to the local bus processor are all under the control of the LCB board.

The remainder of the FIFO control logic in FIG. 3 consists of items 101-107. This logic is concerned with the memory wrap-around function. The memory wrap-around function is a diagnostic mode of operation which permits write operations begun on the local bus processors to be treated the same as memory writes begun on I/O devices connected to the bus. These memory writes are entered into the FIFO through the element 84 and processed as previously described for memory writes originating at I/O devices connected onto the bus. This is shown on gate 86 which allows an MEMRAP function and the time out signal generated onto the bus to generate a clock through gate 86 for flop 84. Normally writes from CPUs located on the local bus do not enter the FIFO as do writes from the I/O devices. Instead, the entry into the cache is made by the gate 102 which indicates a diagnostic memory wrap mode. Gate 102 is inhibited by the MRWRAP signal so that the cache is not updated by the signals applied to gates 106 and 104 because gate 102 has been blocked by the MRWRAP signal. Therefore, the entry into the FIFO for this local bus generated write must be made through the FIFO, in a similar manner as the I/O write.

The function of the FIFO control logic is to detect information existing on the bus that must be entered into the FIFO for relay to the local bus board. For this reason, FIFO control logic is divided into the following subdivisions: FIFO entry logic for detecting four types of entries into the FIFO; logic for detecting that there are entries in the FIFO that have not been processed (the FIFO not-empty condition); logic for controlling the disposition of FIFO entries when the LCB is busy—write break-in timing logic; logic for disposing of second half bus cycles; and the last element is logic for inhibiting the writing into the cache from the LCB board of memory reference writes detected on the bus and entered into the FIFO when a diagnostic mode of operation is in process.

The various entries into the FIFO are as follows. For memory reference writes an entry is written into the FIFO when it has been determined that the memory has received the order and accepted it (ACKED). If a memory reference write is being performed, it will be entered into the FIFO. In the memory reference wrap mode when the maximum physical memory has been exceeded, entries into the FIFO are enabled by the time out signal. This is a special diagnostic mode to enable a testing of all the address lines, regardless of the amount of memory present on a given system.

The second entry into the FIFO is generated by second half bus cycles originating on the bus. The starting point of the second half bus cycle entries into the FIFO is the second half bus cycle signal BSHSBC which is generated on the bus. This signal serves as a timing point for putting these entries into the FIFO for transmission to the central processor, the CIP processor or the SIP processor. The BSDCN signal delayed by 90 nanoseconds is utilized to make such entries in the absence of a second half bus cycle signal BSHBC on the bus.

A third type of entry into the FIFO is the first half cycle which is a non-memory command directed to one of the 6X auxiliary processors, either the SIP or the CIP. This command is generated by a diagnostic processor located on the bus and is used to control the operation of the CIP or the SIP in the absence of the 6×local bus processor.

A fourth entry into the FIFO has to do with unavailability of response to commands generated by the MBA. Either the command itself goes unrecognized by the addressee or the addressee receives the command but does not respond as requested. In either of these situations the MBA, by way of a time out signal, will generate an entry into the FIFO in order to complete the process and inform the MBA of the error condition.

The last entry into the FIFO concerned with time out is controlled by the MYTMOT signal generated by the MBA three microseconds after an order has been issued and no response has been received, or by the unavailable signal generated by the MBA after it has been waiting for 1.1 milliseconds for the unit it sent an order to respond.

The various entries into the FIFO generate certain cycles. One of these is called the FIFO cycle, FICYCL. A FICYCL is generated by the memory write signal MEMACK. If the write is accepted by the memory and the local bus is not busy, a FIFO cycle will be generated. The FIFO request line will be sent to the LCB, which will respond to the FIFO request by testing the cache to see if the address of the memory write that had an ACK signal is contained in the cache. If it is, the cache content will be updated; otherwise the cache will be undisturbed. The timing and control for the FIFO cycle are all located on the LCB, and are initiated by the FIFO request line and the various control signals sent from the FIFO.

The second process invoked by the writing of information into the FIFO is the write break-in (WBRKIN) process. The write break-in (WBRKIN) process is generated as a result of the memory ACK entry into the FIFO. A unit write into a memory, the memory accepted it and it was written into the FIFO; but at the time the request was written into the FIFO, the local bus was busy trying to perform an operation that required access to the bus for one of the processors connected to the local bus. In this case, a FIFO cycle cannot be initiated so a WBRKIN process must be initiated. The WBRKIN process is controlled by logic contained on the MBA board. What the WBRKIN logic does is to inhibit the operation currently in progress on the LCB board, inhibit it temporarily, and allow control of the local bus circuits to be taken over by the bus write timing controls on the MBA which simulate a FIFO cycle. That is, it tests the cache to see if the current address of the word to be written into memory is contained in the cache; and if it is, the word is taken from the FIFO, transferred to the LCB and written into the cache. After this has been done the WBRKIN timing logic restores the LCB to its previous condition provided that there are no more operations for the WBRKIN logic to perform. If there are other acknowledged (ACKED) memory writes in the FIFO then this process is reiterated.

The process for WBRKIN is a four-step process which consists of transferring data into the LCB local data register from the FIFO; generating a write pulse MBWTMG to write that information into the cache, provided that there is a hit in the cache for this particular address; incrementing the read address counter to indicate that one entry into the FIFO has been served; and detecting whether or not there is still further information to be written into the cache.

The third process, called the REDSHB response, is initiated by two of the entries into the FIFO. One is for the normal SHBFIF entry and the other is for the SHBUNV entry. Both of these entries into the FIFO will generate a REDSHB response. The REDSHB response is controlled by logic contained on the MBA board. The REDSHB condition is detected and it consists of three points. First, the data is transferred from the FIFO to the local data register by the signal REDLDR. Then, the LCB is sent a signal from the second point, which is the REDOVR, and indicates that the information that it has been waiting for is now available in its local data register. The third point is the REDINC which generates a signal which increments the read address counter indicating that one entry in the FIFO has been processed.

A fourth process is generated by entry into the FIFO of a bus cycle operation which is generated by the OPTACK response. The OPTACK response will cause a FIFO request signal to be sent to the LCB but it will not invoke further logic on the MBA board itself. The LCB board will respond to the FIFO request signal and the absence of MEMREF (memory reference) and second half bus cycle (SHBC) signals by transferring the information from the FIFO and relaying it to the addressed processor. At the end of this operation, the LCB will generate signal 43, INFRAR. This signal will in turn create the signal RARINC which will increment a read address counter indicating that one entry has been processed from the FIFO.

The diagnostic mode of operation is defined by the MRWRAP mode, which is invoked by setting a bit in the (diagnostic) mode register on the LCB. The mode register is written into on a bit-by-bit basis as a result of instructions from the CPU. When the mode register MRWRAP bit is set, updating of the cache for write cycles generated by the 6×processor is modified so that these 6×processor writes are updated in the cache exactly as if they had originated from I/O devices. The cache is updated whenever a write operation is performed at any memory location, by matching the address of that memory location with all the addresses contained in the cache directory. If the address currently being written into matches an entry located someplace in the cache, the cache data store must be updated with the new information that is being written into the memory.

There are three conditions under which this updating process is carried out. The first is write operations performed by processors located on the local bus. The normal mode of updating is done for these types of writes in parallel with the writing of the information into memory by way of the bus. It is written into the cache directly from the information supplied by the CPU without being fed back from the MBA or the bus. The other two types of writes into the cache for updating purposes are generated by information originating on the bus captured by the MBA into a FIFO, then relayed to the LCB for transmission into the cache. Normally these writes originate from I/O devices connected to the bus; but when the MRWRAP mode is invoked, write operations originating in the 6×processor are also treated in this manner. The write operation originated on the bus may enter the cache by way of two difference operations, one called a FIFO CYCLE and the other called a WBRKIN. Both have the same origin as far as the MBA and the FIFO is determined, but they are treated differently. They are divided in two operations depending on the state of the cache. If the memory write, the bus write, is detected at the time when the cache is busy (that is, connected to the MBA in trying to perform some operation for one of the 6×processors) then that operation must be set aside to enable the cache directories to be searched for the current write. This is the WBRKIN way to update the cache data store. If the cache was idle and was not connected to a local processor and the MBA, a FIFO cycle would be generated. There would be no need to interrupt the LCB and the information would be written into it directly from the FIFO. Information is written into the cache on the basis of a signal WTMGMU which is a common timing signal and which is a collector of three different timing signals—one for the CPU writes originated on the local bus, another for the WBRKIN and a third for the FIFO cycles entries. These three entries define the pulse time and width for writing into the cache data store. The write timing pulse energizes gates which are conditioned by the hit signals and are conditioned by the addressing pattern derived from the write control lines, which define the number of bytes that are to be written. The hit signals indicate that the current address is located in the cache directories. These three signals are combined to produce a write enable signal which will write information into the cache at the address that is being used to reference memory. Normally at a time specific to the LCB, the 6×processors update the cache. However, in MRWRAP mode this gate is inhibited and in MRWRAP mode the updating of the cache by way of the FIFO is enabled either by way of a WBRKIN or by way of a FIFO cycle. Functionally the flop MEMACK is written into normally whenever there is a BUSACK signal received from the memory reference write. All writes originating from the bus units are treated in this way. The MRWRAP signal not being true allows this operation to take place. If the MRWRAP signal is true it further allows the writes generated by the local processors to be written into the FIFO by controlling the clock and the data leads into the MEMACK flop.

Having shown and described a preferred embodiment of the invention, those skilled in the art will realize that many variations and modifications may be made to effect the described invention and still be within the scope of the claimed invention. Thus, many of the elements indicated above may be altered or replaced by different elements which will provide the same results and fall within the spirit of the claimed invention. It is the intention, therefore, to limit the invention only as indicated by the scope of the claims.

What is claimed is:

1. A data processing system comprising a plurality of units including a central processor unit (CPU), a subordinate processor unit (SUB), a local bus coupled to said (CPU) and (SUB), a local bus adapter coupled to said local bus for the transfer of information in a primary mode of operation directly between the CPU and SUB, an input output unit (I/O) for issuing input output commands to transfer information from the I/O to said CPU and SUB, a common bus coupled to said (I/O) CPU and SUB for providing a path for the transfer of information between the I/O and the CPU and SUB, a common bus adapter including wrap-around logic means coupled to said local bus adapter and to said common bus for capturing information being transferred on the common bus and directing that information to the CPU and SUB, and also for transferring information from the CPU and SUB to the common bus, and said wrap-around logic means in said local bus and common bus adapters for inhibiting transfer of information directly between the CPU and SUB and for returning information from the CPU or SUB utilizing input output commands issued by said I/O, which information has been previously transferred to the common bus under commands issued by said CPU, back through the common bus adapter to the CPU or SUB in a secondary mode of operation;

whereby there is provided an alternate route for issuing instructions from the CPU to the SUB, by having the CPU and its SUBs coupled by dedicated private interfaces, with instructions issued directly from the CPU to these interfaces, and whereby the wrap-around logic means detects information that is not to be transferred to the I/O units and accordingly reroutes it back to the CPU or its SUBs.

2. A data processing system as claimed in claim 1 wherein the common bus adapter includes first-in-first-out registers (FIFO) for transferring information to the local bus adapter.

3. A data processing system as claimed in claim 2 wherein the logic bus adapter further includes a cache memory for receiving and storing information from the FIFO, the CPU and the SUB.

4. A data processing system as claimed in claim 3 further comprising a main memory on the common bus, the common bus adapter comprising logic for detecting transfers of information from the I/O to the main memory and for causing that information to be passed through the FIFO to cache memory and the logic means comprising means for causing information on the common bus from the CPU or SUB to be handled by the common bus adapter as information transferred between the I/O and the main memory.

* * * * *